United States Patent [19]

McLean et al.

[11] Patent Number: 4,816,533

[45] Date of Patent: Mar. 28, 1989

[54] EPOXY FORTIFIERS BASED ON AROMATIC AMINES

[75] Inventors: Paul D. McLean, Nepean, Canada; Andrew Garton, Storrs, Conn.; Robert F. Scott, Nepean, Canada

[73] Assignee: Canadian Patents and Development Ltd., Ottawa, Canada

[21] Appl. No.: 83,949

[22] Filed: Aug. 7, 1987

Related U.S. Application Data

[63] Continuation-in-part of Ser. No. 803,239, Dec. 2, 1985, abandoned, which is a continuation-in-part of Ser. No. 516,641, Jul. 25, 1983, abandoned.

[30] Foreign Application Priority Data

Aug. 12, 1982 [CA] Canada .................................. 409305

[51] Int. Cl.$^4$ ............................................. C08L 63/02
[52] U.S. Cl. ...................... 525/526; 528/103; 528/407
[58] Field of Search ................ 525/526; 528/407, 111, 528/103, 361

[56] References Cited

U.S. PATENT DOCUMENTS

| | | | |
|---|---|---|---|
| 2,918,439 | 12/1959 | Phillips et al. | 525/526 |
| 2,982,752 | 5/1961 | Phillips et al. | 525/526 |
| 3,310,528 | 3/1967 | Garnish et al. | 525/526 |
| 3,449,375 | 6/1969 | Newey | 525/526 |
| 3,518,220 | 6/1970 | Landau et al. | 525/526 |
| 3,860,541 | 1/1975 | Lehmann et al. | 525/423 |
| 3,963,666 | 6/1976 | Schreiber et al. | 525/526 |

FOREIGN PATENT DOCUMENTS

| | | | |
|---|---|---|---|
| 2549656 | 5/1976 | Fed. Rep. of Germany | 525/526 |
| 82/0044816 | 1/1982 | PCT Int'l Appl. | 525/526 |

*Primary Examiner*—John C. Bleutge
*Assistant Examiner*—Robert E. L. Sellers, II
*Attorney, Agent, or Firm*—Alan A. Thomson

[57] ABSTRACT

Epoxy resins have been found to be fortified (increased strength and modulus yet not brittle) by compounding
  (a) a resin-forming polyepoxide,
  (b) an amine curing agent for (a),
  (c) a fortifier for (a)+(b) comprising the reaction product of
    (i) an aromatic amine having an amine group attached to an aromatic ring; and
    (ii) non-symmetrical diepoxide;
    the reaction product optionally being further reacted with isocyanates or nitriles, in which case (ii) may be at least partly, a monoepoxide;
and heat curing the mixture. Strengths as high as 130–150 MPa and modulus increases to as high as 5000 MPa have been attained along with a ductile mode of fracture.

10 Claims, 3 Drawing Sheets

EPOXY FORTIFIERS BASED ON AROMATIC AMINES

This application is a continuation-in-part of application No. 803,239 filed Dec. 02, 1985, now abandoned, which was a continuation-in-part of application No. 516,641 filed July 25, 1983, now abandoned.

This invention relates to epoxy resin systems which have increased strength and modulus without becoming brittle. This fortification has been achieved by the addition of a reaction product of an aromatic amine and non-symmetrical diepoxide.

BACKGROUND AND PRIOR ART

Epoxy resin matrices are usually two-component systems, comprising a resin component [e.g. a diglycidyl ether of bisphenol A (DGEBA)] and a crosslinking agent [e.g. methylenedianiline (MDA)]. Diluents or fillers are also often added for economic or processing reasons. The resin and curing agent are mixed and "cured", usually at elevated temperatures. The above matrix would typically have a strength of 85 MPa, a modulus of 2800 MPa, a glass transition temperature ($T_g$, a maximum use temperature) of ~150° C. and would fracture in an essentially brittle fashion (H. Lee and K. Neville, "Handbook of Epoxy Resins", McGraw-Hill, New York, 1967). Considerable effort has been expended to improve on these properties.

However, no completely satisfactory solution currently exists because improvement in one property has been gained only at the expense of another (e.g. solvent resistance, $T_g$, ductility, processability, cost).

Many curing agents or hardeners have been used in epoxy resin systems, in particular amines such as methylene dianiline and tetraethylenetriamine. In some cases, adducts of these same amines with mono- or diepoxides have been used as curing agents. In U.S. Pat. No. 4,182,831. Jan. 89, 1980, Hicks, polyepoxide resins are reacted with an aliphatic primary amine mixture, then further reacted with a monoepoxide. U.S. Pat. No. 4,182,832 Jan. 8, 1980, Zondler et al, describes as curing agents for epoxy resins, adducts of substituted 1,4-diaminobutanes and liquid epoxides. U.S. Pat. No. 4,195,152, Mar. 25, 1980, Floyd, describes an adduct of N-alkylpolyamines and mono-epoxides as epoxy resin curing agents. U.S. Pat. No. 4,197,389, Apr. 8, 1980, Becker et al, describes a hardening agent (curing agent) for epoxy resins which is a reaction product of an aliphatic or heterocyclic polyamine, a polyalkylene polyether polyol and at least one polyepoxide. These patents are typical of the more complex curing agents being developed.

Antiplasticization in highly crosslinked epoxy resin systems has been reported in the literature. For instance, N. Hata et al, in J. Appl. Polym. Sci., 17(7), p. 2173-81, 1973, describe pentachlorobiphenyl as the most effective antiplasticizer, and dibutylphthalate and 2,2-bis-[4-(2-hydroxy-3-phenoxypropoxy)phenyl] propane as less effective antiplasticizers. There evidently has been little recent interest in this, possibly because materials such as pentachlorobinphenyl are environmentally objectionable.

In U.S. Pat. No. 3,449,375, June 10, 1969, Newey, flame-retardant epoxy resins are described comprising the reaction product of a haloalkyl monoepoxide and a trihaloaniline, which is dehydrohalogenated to form a diepoxide having two epoxyalkyl groups attached to the amino group. The reaction is controlled so that the epoxide groups remain unreacted, and no hydroxyl groups are formed. These trihalodiglycidyl anilines exhibit reactions typical of the glycidyl ether group and may be added to other epoxy resins and the mixture cured to give strong, flame-retardant products. One of the other epoxy resin materials may be a monomeric polyepoxide such as vinyl cyclohexene dioxide. It should be noted that the latter diepoxide is not reacted with the trihaloaniline itself in this Newey patent.

We have found an alternative method of improving the properties of epoxy resins, by adding reaction products which act as fortifiers, to conventional epoxy resin+curing agent formulations.

SUMMARY OF THE INVENTION

The invention primarily is directed to a curable epoxy resin composition giving high strength products comprising:
(a) a resin-forming polyepoxide
(b) an amine curing agent for (a) which is exclusive of (c) and
(c) a fortifier for (a)+(b) consisting essentially of the reaction product of:
  (i) an aromatic amine having an amine group attached to an aromatic ring, and
  (ii) a diepoxide having one epoxide group less reactive than the other, said diepoxide being exclusive of polyepoxide (a); the mole ratio of (i)/(ii) being selected from 1/1-1/6 with the fortifier (c) containing both unreacted epoxide and hydroxyl groups;
said reaction product being formed in the absence of (a) and (b), and under conditions substantially maintaining said less reactive epoxide group of the diepoxide unreacted.

The invention includes this composition cured to a strong, high modulus solid form having a ductile mode of fracture (i.e. slope of stress-strain curve is negative at failure). The reaction product of the aromatic amine and the diepoxide may be further reacted with an isocyanate or a nitrile to form advantageous fortifiers as described below, in which case the diepoxide can be partly or wholly replaced with a monoepoxide.

The invention further includes a process for fortifying an epoxy resin to give high strength products comprising:
(a) reacting (i) an aromatic amine having an amine group attached to an aromatic ring with (ii) a diepoxide having one epoxide group less reactive than the other, the mole ratio of (i)/(ii) being selected from 1/1 to 1/6 to form a fortifier containing unreacted epoxide and hydroxyl groups said fortifier being formed in the absence of resin-forming polyepoxide and under conditions substantially maintaining said less reactive epoxide group unreacted;
(b) mixing the fortifier with a resin forming polyepoxide which is exclusive of the said diepoxide (ii) and an amine curing agent for the polyepoxide which is exclusive of the fortifier; and
(c) heat curing the mixture to form a strong, high modulus solid having a ductile mode of fracture.

Preferably in step (a) about 1 mole of amine (i) is heated with about 1 to 6 moles (preferably 1-4 moles) of the diepoxide at the equivalent of about 75°-190° C. for about 1 hour. In one preferred aspect, the diepoxide is vinyl cyclohexene dioxide whose less reactive epoxide group remains substantially unreacted in the fortifier.

DETAILED DESCRIPTION AND PREFERRED EMBODIMENTS

Figure 1:
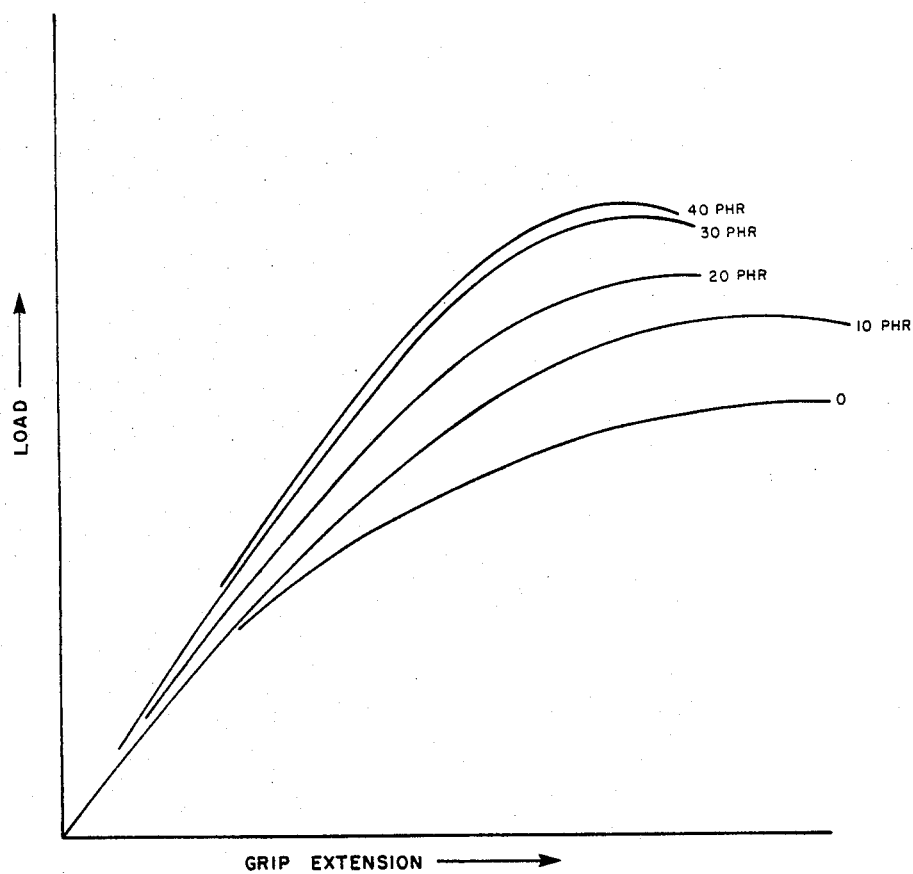
FIG. 1 is a graph showing load vs. extension curves for varying concentrations of fortifier in a cured epoxy resin system.

The resin-forming polyepoxide to be fortified can be any known to form epoxy resin matrices and will have a plurality of reactive 1,2-epoxy groups. These resin-forming polyepoxides should be curable by amine curing agents.

These polyepoxide materials can be monomeric or polymeric, saturated or unsaturated, aliphatic, cycloaliphatic, aromatic or heterocyclic, and may be substituted, if desired, with other substituents besides the epoxy groups e.g. hydroxyl groups, ether radicals, aromatic halogen atoms and the like.

A widely used class of polyepoxides which can be fortified according to the practice of the present invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol; 2,4'-dihydroxydiphenylethylmethane; 3,3'-dihydroxydiphenyldiethylmethane; 3,4'-dihydroxydiphenylmethylpropylmethane; 2,3'-dihydroxydiphenylethylphenylmethane; 4,4'-dihydroxydiphenylpropylphenylmethane; 4,4'-dihydroxydiphenylbutylphenylmethane; 2,2'-dihydroxydiphenylditolylmethane; 4,4'-dihydroxydiphenyltolyl-methyl methane and the like. Other polyhydric phenols which may also be co-reacted with an epihalohydrin to provide these epoxy polyethers are such compounds as resorcinol, hydroquinone, substituted hydroquinones, e.g. p-tert-butylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g. polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as α-monothioglycerol, α,α'-dithioglycerol, and the like, polyhydric alcohol partial esters, such as monostearin, pentaerythriotol monoacetate, and the like, and halogenated polyhydric alcohols, such as the monochlorohydrins of glycerol, sorbitol, pentaerythritol and the like.

Another class of polymeric polyepoxides which can be cured by means of the amine curing agents and fortified, includes the epoxy novolac resins obtained by reacting, preferably, in the presence of a basic catalyst, e.g. sodium or potassium hydroxide, an epihalohydrin, such as epichlorohydrin, with the resinous condensate of an aldehyde, e.g. formaldehyde, and either a monohydric phenol, e.g. phenol itself, or a polyhydric phenol. Further details concerning the nature and preparation of these epoxy novolac resins can be obtained in H. Lee and K. Neville, "Handbook of Epoxy Resins".

Other suitable polyglycidyl compounds are the polyglycidyl esters of polycarboxylic acids, such as the polyglycidyl esters of adipic acid, phthalic acid and the like. Polyglycidyl esters of polycarboxylic acids are described in detail in U.S. Pat. No. 2,870,170 to Payne et al. Also suitable are polyglycidyl compounds produced by reacting epichlorohydrin with aromatic amines such as aniline, 2,6,-dimethylaniline, p-toluidine, m-chloroaniline, p-aminodiphenyl, m-phenylenediamine, p-phenylenediamine, 4,4'-diaminodiphenyl methane, or with amino phenols such as p-aminophenol, 5-amino-1-n-naphthol, 4-aminoresorcinol, 2-methyl-4-aminophenol, 2-chloro-4-aminophenol and the like. Specific compounds include, among others, N,N-diglycidylaniline, N,N-diglycidyl-2,6-dimethylaniline, N,N,N'N,-tetraglycidyl-4,4'-diaminodiphenyl methane, the triglycidyl derivative of p-aminophenol wherein the aminohydrogen and OH hydrogen atoms are replaced by glycidyl groups.

It will be appreciated by those skilled in the art that the polyepoxide compositions which can be cured and fortified according to the practice of the present invention are not limited to those containing the above described polyepoxides, but that these polyepoxides are to be considered merely as being representative of the class of polyepoxides as a whole.

The amine curing agents are any aromatic or aliphatic amine curing agents (hardeners) known in the art. Typical examples are(methylene dianiline) (MDA), meta-phenylenediamine and other aromatic polyamines, diethylamine, hydrochloride, diethylenetriamine, triethylenetetramine, diethylaminopropylamine, polyoxypropyleneamines and other aliphatic polyamines. Amine adducts such as reaction products of aliphatic amines with epoxide monomers and amino group-containing polyamides are known amine curing agents and would be operative. Heterocyclic amines such as N-aminoethylipiperazine and ethylmethylimidazole may also be used. We prefer the aromatic polyamines particularly when improved high temperature properties are important.

Comparative tests with and without amine curing agents have confirmed that the fortifiers are not effective curing agents although some fortifiers influence the curing rate. For example, a fortifier formed from vinylcyclohexenedioxide and aniline was added to a resin with and without the amine curing agent. Compositions containing 15 and 30 parts by wt. of fortifier per hundred of resin, but no curing agent, did not gel when run through the normal cure cycle. Fortifiers alone with amine curing agents do not produce materials with engineering properties. According to our invention, a resin and curing agent plus fortifier produces stiff, strong materials with a ductile mode of failure.

The aromatic amine reactant used to form the fortifier has the general formula:

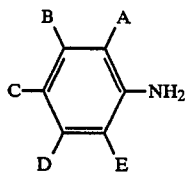

in which A to E are selected from hydrogen, lower alkyl, halogen, halogenated lower alkyl, phenyl, halogenated phenyl, hydroxyl, amino, an alkylene-linked aromatic amine or amide moiety,

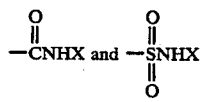

where X is selected from H, lower alkyl and phenyl; and the carboxylic acid group COOH. The lower alkyl or alkylene groups may have from 1–4 carbon atoms. Suitable compounds include aniline, (methylenedianiline), m-phenylenediamine, 4-chloroaniline, 4-bromoaniline, 2,4,6-tribromoaniline, 2,4,6-trichloroaniline, α,α,α-trifluoro-m-toluidene, ortho-toluidine, m- and p-aminophenol, ortho-tolidine, sulfanilamide, anthranilamide, and p-aminobenzoic acid.

The diepoxide reactant contains two vicinal epoxide rings, one of which is less reactive than the other (for structural or chemical reasons). The reactivity of the less reactive epoxide group may be lower because of, e.g. being attached to an alicyclic moiety or by substituents on the alpha-carbons or because of its steric configuration. Suitable dioxides include vinylcyclohexene dioxide (VCD), 3,4-epoxycyclohexylmethyl-(3,4-epoxy)-cyclohexane-carboxylate, limonene dioxide, and p-epoxycyclopentylphenyl glycidyl ether.

The fortifier is formed by reacting the aromatic amine and diepoxide together at a selected temperature, usually within about 70° C. to 200° C., for a time within about 15 min. to abour 4 hr. Preferably, reaction conditions are selected to be equivalent to 75°–190° C. four about 1–2 hrs. at a ratio of 1 mole amine to 1 to 6 moles epoxide. The temperature (and time) are selected to give the desired degree and mode of reaction yet not boil off the more volatile components. Depending on exotherms encountered, it may be necessary to cool the reaction vessel to maintain the desired reaction temperature. Typical temperatures and times found operative are illustrated in the examples. Catalysts can be used to facilitate the reaction. Suitable catalysts for the fortifier formation include those of the type of diethylamine hydrochloride, ethylmethylimidazole, alpha-methylbenzyldimethylamine, and 2-hydroxybenzyldimethylamine. Suitable catalyst concentrations are about 0.1–0.3%.

The use of non-symmetrical diepoxide allows the production of relatively low molecular weight materials with residual epoxy functionality. The majority of the residual epoxy functionality corresponds to the less reactive epoxy group of the diepoxide. These groups are relatively stable to long term storage but can become involved in crosslinking processes during the elevated temperature cure. Typical values of Epoxy Equivalent Weight EEW (a measure of the amount of unreacted epoxy groups in the fortifier) are given in Table 1 and show that, although the amount of residual epoxide varies with the initial reactant ratio and processing conditions, the epoxy fortifiers described here are characterized by a significant epoxy functionality. Such a material is different in its composition and effectiveness from the reaction product of an aromatic amine and a symmetrical diepoxide, which may be considered simply as a partially cured resin. Such partially cured systems may offer advantages in processing or toxicology over conventional amine-cured epoxy resins, but do not produce the effect or mechanical properties characteristic of epoxy fortifiers.

For comparison, the epoxy equivalent weight of a typical epoxy resin (Epon 828) is about 188 and of vinyl cyclohexene dioxide is 76. Higher molecular weight epoxy resins, e.g. Epon 1010, have epoxy equivalent weights of >4000. Partially cured systems as described above may have high epoxy equivalent weights or may even have excess amine functionality depending on the composition of the starting mixture.

TABLE 1

| Epoxy equivalent weight (EEW) of typical fortifiers | | | |
|---|---|---|---|
| AMINE | DIEPOXIDE | RATIO | EEW |
| Aniline | VCD | 1:3 | 113 |
| Aniline | VCD | 1:1.1 | 218 |
| Sulphanilamide | VCD | 1:2.5 | 133 |
| Sulphanilamide | VCD | 1:4 | 113 |
| p-Aminobenzoic acid | VCD | 1:4 | 133 |
| m-Aminophenol | VCD | 1:4 | 131 |
| m-Aminophenol | VCD | 1:5 | 118 |

The reaction products are a complex mixture in each case and were used as fortifiers without purification or separation. The reaction product were viscous oils or low melting point solids. Chromatographic analysis of a typical fortifier showed the presence of at least 12 chemical components in measurable amounts. Several fortifiers have been retested after at least one year of storage and they showed no signs of deterioration.

We have found that (in preparing the fortifiers) when only part of the desired amount of one of the reactants is added initially and reacted, and the remainder introduced later, the reaction product is different than if the full amount had been reacted at one time. Using this variation in properties, it is possible to select both reactants and reaction stages to optimize properties of the fortifier for a particular purpose. It is possible to add a different diepoxide at a second stage of the reaction to vary the properties further. In the same manner, variations or staged additions of the same or different aromatic amines change the properties of the fortifier somewhat. Thus, it is possible to tailor the fortifier to obtain a desired balance of properties for a particular resin system. For each resin-curing agent system, the fortifier is selected to bestow increased tensile stength and modulus on curing.

The concentration of fortifier relative to the resin (resin-forming polyepoxide) may range from an effective amount up to about 50 parts per hundred parts of resin (PHR). Amounts within the range of 5–30 PHR normally are preferred.

These fortifiers will have some free hydroxyl groups available for further reaction. We have found that reaction with isocyanates, nitriles, or mixtures of isocyanates and nitriles gives fortifiers which may impart increased strength, or ductility, or be easier to process than the unmodified fortifiers. Many monoisocyanates may be used, with typical ones being methyl-, ethyl, propyl-, and phenylisocyanates, and halogenated derivatives thereof. Alternatively, nitrile reactants may be used and these may be mono- or dinitriles. Suitable nitrile reactants include p-amino-benzonitrile, phthalonitrile, malononitrile, succinonitrile, butyronitrile, adiponitrile and acrylonitrile. Halogenated derivatives of these nitriles can be used. The reaction conditions with nitrile reactants generally are about 1 hr at 130°–150° C., though variations are possible (e.g. acrylonitrile is processed at 55°–60° C.). With the isocyanates, they are added cold and usually in stages since the reaction is exothermic, preferably with the final temperature controlled to be about 120° C.

The final cure conditions of the resin-forming polyepoxide+amine curing agent+fortifier generally follow conventional epoxy resin cure techniques. Usually at least two cure stages are utilized, with preferred cure sequences being within the ranges:
initial stage 60°–100° C. for 30 min.–4 hrs.
intermediate stage 100°–130° C. for 1 hr.–6 hrs.
final stage 140°–200° C. for 1 hr.–16 hrs.
Those skilled in the art will be able to determine a suitable cure cycle for any particular system.

The following examples are illustrative.

EXAMPLE 1

Vinylcyclohexene dioxide (VCD) was mixed with aniline at a mole ratio of 2:1 and 0.25% of diethylamine hydrochloride added as a catalyst. The mixture was heated at 190° C. for 2 hours to give a fortifier designated as VCD-A. The main reaction product will have the formula

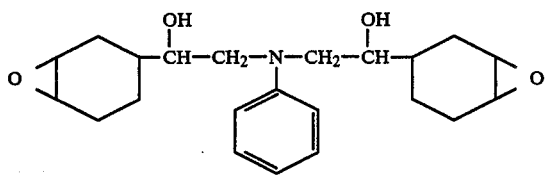

Figure 2:
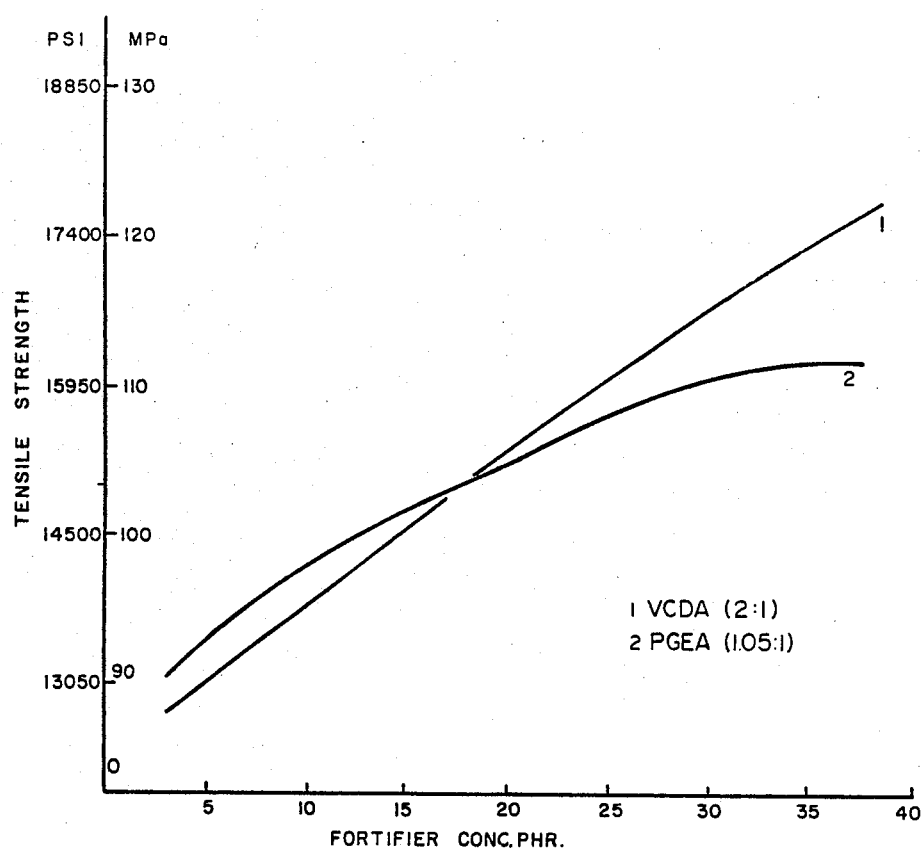
FIG. 2 is a graph showing the effect of fortifier concentration on tensile strength in a cured epoxy resin system.

This fortifier was mixed with Epon 828 (trademark for a diglycidyl ether of bisphenol A epoxy resin) containing methylene dianiline as a curing agent. The amount of curing agent was adjusted, depending on the amount of fortifier, to maintain an added active hydrogen to epoxy group ratio of approximately 1:1. The system was cured at 100° C. for 3 hours, +125° C. for 2 hours, +175° C. for 4 hours. The load vs. grip extension curves for 1, 10, 20, 30 and 40 PHR of this fortifier in the system are shown in FIG. 1. The tensile strength results are shown for varying concentrations of fortifier in FIG. 2 and the strength is seen to increase with concentration of fortifier, i.e. from about 80 MPa to about 120 MPa at 35 PHR fortifier (a phenylglycidylether:aniline 1.05:1 is shown for comparison).

EXAMPLE 2

Using the same resin-forming polyepoxide (Epon 828) as in Example 1, but with an aliphatic amine curing agent, and using the fortifier of Example 1, compounding and curing were carried out as follows:
A mixture of 34 parts of a polyoxypropyleneamine (Jeffamine D-400-trademark) and 4 parts of diethylenetriamine was prepared as curing agent, and mixed with 100 parts of Epon 828 and 30 parts of the vinylcyclohexene dioxide-aniline fortifier, then cured at 50° C. for 1 hour, +80° C. for 1 hour, +125° C. for 4 hours. The cured material had a tensile strength of 8132 psi and the tensile test specimen failed in a ductile fashion.

EXAMPLE 3

Figure 3:
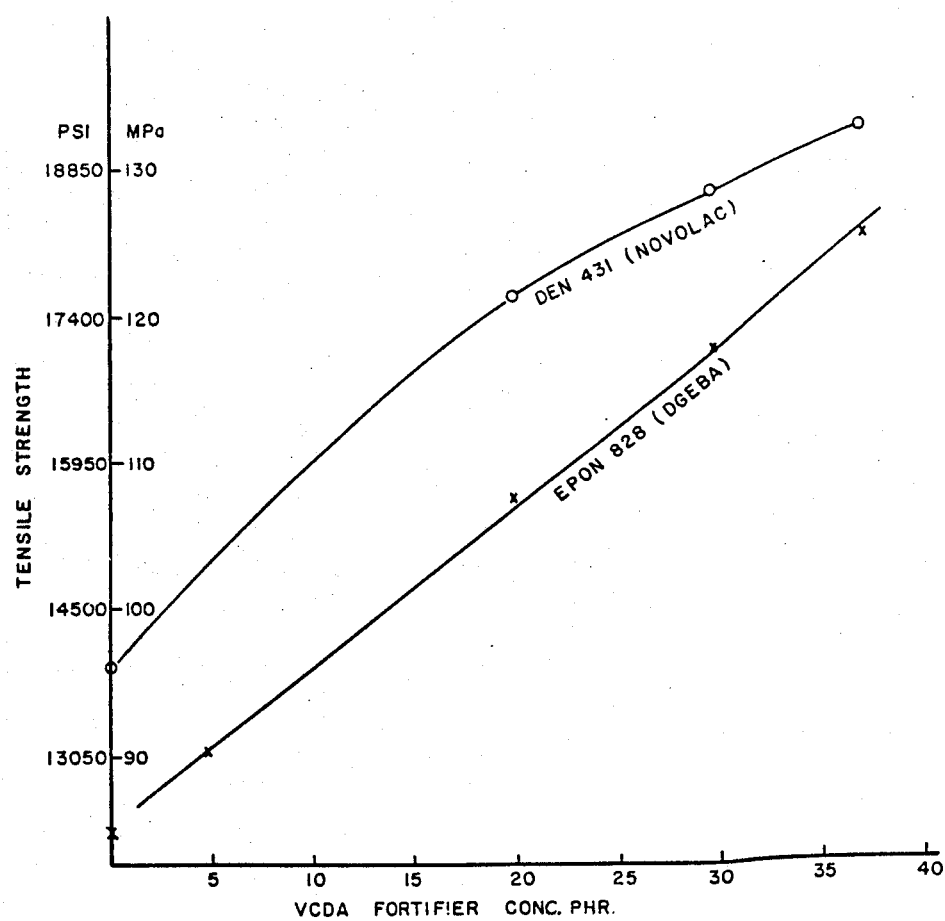
FIG. 3 is a graph showing the variation in tensile strength with fortifier concentration for two different resin systems.

The effect of fortifying an epoxy novolac resin (Den 431-Dow Chemical) compared to Epon 828 was investigated. Varying concentrations of the fortifier VCD-A (prepared as in Example 1) were added to each resin and the systems cured with 30 PHR methylene dianiline using the cure cycle 100° C. for 3 hours, +125° C. for 2 hours, +175° C. for 4 hours. The results are shown in FIG. 3. The novolac resin consistency had a strength about 10 MPa higher than the Epon 828 and tensile strengths over 130 MPa (over 19000 psi) were realised.

EXAMPLE 4

A fortifier was made from vinylcyclohexene dioxide and sulfanilamide at a mole ratio of 2.75:1 as in example 1 except heating to 130° C. for 1 hour. This fortifier (VCDSAA) was mixed at two proportions with Epon 828 containing 30 PHR methylene dianiline curing agent and cured as in Example 1. The results are summarised in Table 2.

TABLE 2

| Fortifier VCDSAA PHR | Epoxy Resin Epon 828 | Crosslinking Amine, MDA PHR | Tensile Strength psi | $T_g$ °C. |
|---|---|---|---|---|
| 10 | 100 | 30 | 14010 | 162 |
| 30 | 100 | 30 | 17440 | 147 |

EXAMPLE 5

A fortifier was made from vinylcyclohexene dioxide and anthranilamide (o-aminobenzamide) at a mole ratio of 2:1 with heating to 130° C. for 1 hour. This fortifier (VCDANT) was mixed at 2 proportions with Epon 828 resin and cured as in Example 1. The results are summarised in Table 3.

TABLE 3

| Fortifier VCDANT PHR | Epoxy Resin Epon 828 | Crosslinking Amine, MDA PHR | Tensile Strength psi | $T_g$ °C. |
|---|---|---|---|---|
| 20 | 100 | 30 | 14910 | 155 |
| 30 | 100 | 35 | 16500 | 148 |

EXAMPLE 6

A fortifier was made from vinylcyclohexene dioxide and p-aminobenzoic acid at a mode ratio of 4:1, with heating to 110° C. for 1 hour. This fortifier (VCDABA) was mixed at 2 proportions with Epon 828 and cured as in Example 1. the results are summarised in Table 4.

TABLE 4

| Fortifier VCDABA PHR | Epoxy Resin Epon 828 | Crosslinking Amine, MDA PHR | Tensile Strength psi | $T_g$ °C. |
|---|---|---|---|---|
| 20 | 100 | 31 | 13350 | 166 |
| 30 | 100 | 31.5 | 15250 | 158 |

EXAMPLE 7

A cycloaliphatic resin (a cyclohexane diepoxy carboxylate) known as Araldite CY 179 (Trademark) was fortified and cured. The fortifiers were VCDA and VCDSAA prepared as above and VCDMAP. The latter was prepared from vinylcyclohexene dioxide and m-aminophenol in a mole ratio of 3:1 with heating to 120° C. for 1 hour. Curing was for 3 hours at 100° C. and then 6 hours at 180° C. The results are summarised in Table 5.

TABLE 5

| Fortifier PHR | Resin CY 179 | Crosslinking Amine, MDA PHR | Tensile Strength psi | $T_g$ °C. |
|---|---|---|---|---|
| 10 VCDA | 100 | 65 | 14970 | 142 |
| 10 VCDMAP | 100 | 65 | 15420 | 150 |
| 10 VCDSAA | 100 | 65 | 16350 | 145 |

A nitrile-modified fortifier was prepared by reacting one mole of the VCD-A fortifier of Example 1 with 1 mole of p-aminobenzonitrile by heating to 150° C. for 1 hour. Upon compounding various amounts of this fortifier with Epon 828 and 30 PHR MDA and curing as in Example 1, the following results were obtained.

TABLE 6

| Amount of Fortifier | Tensile Strength, psi |
|---|---|
| 30 PHR | 17430 (ductile) |
| 35 PHR | 18030 (ductile) |
| 40 PHR | 18330 (ductile) |

Similar results have been obtained with fortifiers made from other amine reactants including 4-chloroaniline; 2,4,6-trichloroaniline; ααα trifluoro-m-toluidene; p-aminobenzoic acid; and m-aminophenol. Still other such reactants would be operative.

EXAMPLE 9

A isocyanate-modified fortifier was prepared by adding 0.5 moles of phenyl isocyanate to one mole of a fortifier based on sulphanilamide and VCD (VCDSAA, molar composition 3 mole VCD+1 mole SAA, prepared as in Example 4). Reaction was rapid and exothermic and the reaction product was held at 120° C. for 30 minutes. The fortifier was further modified by reaction with 0.5 moles of acrylonitrile as described in Example 8. This fortifier was mixed at 2 proportions with XD 7818 (Dow Chemical-DGEBF epoxy resin) and Tonox (trademark for metaphenylenediamine/methylene dianiline) curing agent and cured as in Example 1.

TABLE 7

| Fortifier PHR | Resin | Tonox PHR | Tensile Strength psi | $T_g$ °C. |
|---|---|---|---|---|
| — | XD7818 | 27 | 15000 | 145 |
| 30 | XD7818 | 34 | 18650 | 136 |
| 40 | XD7818 | 38 | 19430 | 133 |

We have also observed the effective epoxy fortifiers can be prepared by substituting a monoepoxide, e.g. phenylglycidyl ether (PGE), for at least part of the diepoxide component, providing the resultant product is further reacted with a nitrile or isocyanate. Fortifiers containing nitriles or isocyanates usually have a lower viscosity and extend the shelf life. With aniline or chloroaniline as the amine reactant, the reaction conditions were similar to the equivalent diepoxide based system. The resultant product gave increased stiffness and strength to amine-cured epoxy resins, but at some sacrifice of glass transistion temperature compared to the diepoxide based system. Thus the fortifier composition may be one where the diepoxide component is replaced at least partially by a monoepoxide of the formula:

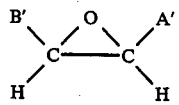

where A' and B' are selected from hydrogen, halogen, lower alkyl, halogenated lower alkyl, phenyl, halogenated phenyl and an alkylene-linked aromatic ether moiety, and the aromatic amine-monoepoxide product is further reacted with the isocyanate, nitrile or mixture thereof.

EXAMPLE 10

A monoepoxide based fortifier was prepared by reacting 1 mole of aniline (A) or chloroaniline (CA) with 1 mole of phenylglycidyl ether (PGE) at 150° C. for 2 hours. The mixture was then cooled and 1 mole of ethyl isocyanate added slowly. The resulting mixture was held at 120° C. for 30 minutes. Three levels of this fortifier were incorporated in an epoxy resin plus cross-linking amine and these mixtures cured as in Ex. 1. The results are summarized in Table 8.

TABLE 8

| Fortifier PHR | Epoxy Resin Epon 828 | Crosslinking Amine, MDA | Tensile Strength psi | |
|---|---|---|---|---|
| PGE-15 | 100 | 30 | 15870 | ductile |
| -A 20 | 100 | 30 | 16280 | ductile |
| 25 | 100 | 30 | 16500 | ductile |
| PGE-15 | 100 | 30 | 15690 | ductile |
| -CA 20 | 100 | 30 | 16530 | ductile |
| 25 | 100 | 30 | 16750 | ductile |

EXAMPLE 11

A fortifier was prepared from VCD and aniline as in Ex. 1 with the mole ratio VCD/A of 2:1. Two epoxy resin formulations were made up, one containing the fortifier and the other containing equivalent amounts of unreacted VCD and aniline.

| Formulation A | (Parts by wt.) | Formulation B | |
|---|---|---|---|
| Polyepoxide Epon 828 | 100 | Polyepoxide Epon 828 | 100 |
| Fortifier VCD-A | 20 | VCD | 13 |
| Methylene dianiline | 30 | Aniline | 7 |
| | 150 | Methylene dianiline | 30 |
| | | | 150 |

The wt. ratio of VCD/A of 13:7 corresponds to the wt. ratio in the fortifier at the mole ratio of 2:1. Both formulations were cured as in Ex. 1, and the tensile strengths measured. The results were:

| Formulation | Tensile Strength (PSI) | Remarks |
|---|---|---|
| A | 15,600 | high modulus dark colour |
| B | 14,400 | low modulus high elongation pale yellow colour |

It is evident that the pre-reacted fortifier was more effective than the same amounts of VCD and aniline (unreacted) in curing the polyepoxide to a high strength and modulus. Formulation B is analogous to that of the Newey U.S. Pat. No. 3,449,375 mentioned above: the pre-reacted fortifier is seen to be significantly more effective in strengthening the resin.

We claim:

1. A curable epoxy resin composition giving high strength products comprising:
   (a) a resin-forming polyepoxide,
   (b) an amine curing agent for (a) which is exclusive of (c); and
   (c) a fortifier for (a)+(b) consisting essentially of the reaction product of:
      (i) an aromatic amine having an amine group attached to an aromatic ring, and
      (ii) a diepoxide having one epoxide group less reactive than the other, said diepoxide being exclusive of polyepoxide (a); the mole ratio of (i)/(ii) being selected from 1/1-1/6 with the fortifier (c) containing both unreacted epoxide and hydroxyl groups; said reaction product being formed in the absence of (a) and (b), and under conditions substantially maintaining said less reactive epoxide group of the diepoxide unreacted.

2. The composition of claim 1 wherein the aromatic amine reactant of the fortifier (c)(i) is of the formula:

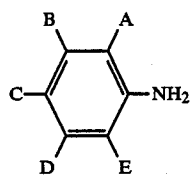

in which A to E are selected from hydrogen, lower alkyl, halogen, halogenated lower alkyl, phenyl, halogenated phenyl, hydroxyl, amino, the carboxylic acid group —COOH, an alkylene-linked aromatic amine or amide moiety,

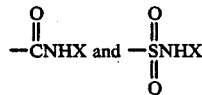

(where X is selected from H, lower alkyl and phenyl).

3. The composition of claim 1 wherein the diepoxide reactant is vinyl cyclohexene dioxide whose less reactive epoxide group remains unreacted in the fortifier.

4. The composition of claim 1 wherein the concentration of the fortifier ranges up to about 40 parts by wt. per hundred of the resin.

5. The composition of claim 1 wherein the amine curing agent is selected from methylene dianiline, N-aminoethylpiperazine, metaphenylenediamine, and ethylmethylimidazole.

6. The composition of claim 1 cured to a strong, high modulus solid form having a ductile mode of fracture.

7. A process for fortifying an epoxy resin to give high strength products comprising:
   (a) reacting (i) an aromatic amine having an amine group attached to an aromatic ring with (ii) a diepoxide having one epoxide group less reactive than the other, the mole ratio of (i)/(ii) being selected from 1/1 to 1/6 to form a fortifier containing unreacted epoxide and hydroxyl groups said fortifier being formed in the absence of resin-forming polyepoxide and under conditions substantially maintaining said less reactive epoxide group unreacted;
   (b) mixing the fortifier with a resin forming polyepoxide which is exclusive of the said diepoxide (ii) and an amine curing agent for the polyepoxide which is exclusive of the fortifier; and
   (c) heat curing the mixture to form a strong, high modulus solid having a ductile mode of fracture.

8. The process of claim 7 wherein in step (a) about 1 mole of amine (i) is heated with about 1 to 4 moles of diepoxide at the equivalent of about 75°–190° C. for about 1 hr.

9. The process of claim 7 wherein step (a) is carried out in the presence of a catalyst of the type of diethylamine hydrochloride, ethylmethylimidazole, alpha-methylbenzyldimethylamine, and 2-hydroxybenzyldimethylamine.

10. The composition of claim 3 wherein said fortifier has an Epoxy Equivalent Weight within the range of about 113 to about 218.

* * * * *